US009482326B2

(12) United States Patent
Drennen et al.

(10) Patent No.: US 9,482,326 B2
(45) Date of Patent: Nov. 1, 2016

(54) ELECTROMECHANICAL ACTUATOR

(71) Applicant: Goodrich Corporation, Charlotte, NC (US)

(72) Inventors: David Drennen, Bellbrook, OH (US); Harald Klode, Centerville, OH (US); Kevin Rehfus, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 318 days.

(21) Appl. No.: 13/935,120

(22) Filed: Jul. 3, 2013

(65) Prior Publication Data

US 2015/0007679 A1    Jan. 8, 2015

(51) Int. Cl.
| | |
|---|---|
| *F16H 25/22* | (2006.01) |
| *B60T 13/74* | (2006.01) |
| *B64C 13/50* | (2006.01) |
| *F16D 55/226* | (2006.01) |
| *F16D 65/18* | (2006.01) |
| *F16D 121/24* | (2012.01) |
| *F16D 125/36* | (2012.01) |
| *F16D 125/40* | (2012.01) |
| *F16D 125/50* | (2012.01) |

(52) U.S. Cl.
CPC ......... *F16H 25/2204* (2013.01); *B60T 13/741* (2013.01); *B64C 13/50* (2013.01); *F16D 55/226* (2013.01); *F16D 65/18* (2013.01); *B64C 2013/506* (2013.01); *F16D 2121/24* (2013.01); *F16D 2125/36* (2013.01); *F16D 2125/40* (2013.01); *F16D 2125/50* (2013.01); *Y10T 74/19749* (2015.01)

(58) Field of Classification Search
CPC .................. F16H 25/22; F16H 25/20; F16H 2025/2031; F16H 2025/2087

USPC ........................................................ 74/89.23
See application file for complete search history.

(56) References Cited

U.S. PATENT DOCUMENTS

| | | | |
|---|---|---|---|
| 5,319,991 A * | 6/1994 | Pierrat ......................... 74/89.32 |
| 7,997,596 B2 * | 8/2011 | Yuta et al. ............... 280/86.758 |
| 2002/0074866 A1 | 6/2002 | Morishima et al. | |
| 2003/0015046 A1 * | 1/2003 | Dzurko et al. ............... 74/89.23 |

(Continued)

FOREIGN PATENT DOCUMENTS

| | | |
|---|---|---|
| EP | 2573418 | 3/2013 |
| JP | 11101283 | 4/1999 |
| WO | 2005005854 | 1/2005 |

OTHER PUBLICATIONS

Extended European Search Report dated Jul. 5, 2016 in European Application No. 14169597.3.

*Primary Examiner* — Terence Boes
(74) *Attorney, Agent, or Firm* — Snell & Wilmer, L.L.P.

(57) ABSTRACT

An electromechanical actuator ("EMA") may comprise a ball screw having at least one tab extending from an inner surface thereof and/or an actuator drive unit ("ADU") housing that interfaces with the at least one tab. The bail screw may include three tabs extending from the inner surface thereof. An outer surface of the ball screw may be threaded to mate with a threaded portion of an inner surface of the ADU housing, and/or the ADU housing may interface with the at least one tab, and the ball screw may be rotated to translate a ball nut situated concentrically over ball screw axially. The ADU housing may include a gear train assembly having a carrier plate, wherein the carrier plate includes at least one receptacle.

8 Claims, 4 Drawing Sheets

(56) References Cited

U.S. PATENT DOCUMENTS

| | | | |
|---|---|---|---|
| 2004/0124727 A1* | 7/2004 | Lau | 310/83 |
| 2007/0068746 A1* | 3/2007 | Chittka | F16D 65/18 188/72.6 |
| 2008/0157490 A1* | 7/2008 | Hakui et al. | 280/5.521 |
| 2009/0108130 A1* | 4/2009 | Flatt | B64C 13/28 244/99.9 |
| 2009/0270220 A1* | 10/2009 | Fukano et al. | 475/300 |
| 2010/0066040 A1* | 3/2010 | Suyama | 280/5.522 |
| 2011/0011191 A1 | 1/2011 | Osterlaenger et al. | |
| 2012/0017756 A1* | 1/2012 | Bidare | F03G 7/08 92/3 |

\* cited by examiner

ELECTROMECHANICAL ACTUATOR

FIELD

The present disclosure relates to electromechanical actuators ("EMAs"), and more particularly, to EMAs having a ball screw coupled to a gear train assembly.

BACKGROUND

EMAs comprise systems capable of forcefully moving a moveable member against a brake disk stack so as to, for example, generate a braking force. This braking force may be used, for example, to drive a brake disk stack into forceful engagement, thereby causing braking of a wheel, such as a wheel of an aircraft.

EMAs may comprise a housing enclosing a variety of components, such as a ball screw and a gear train assembly. The gear train assembly may be coupled to an electromechanical motor, which causes the ball screw to rotate within a ball screw housing (or "ball nut"). As the ball screw rotates, the ball nut may translate axially relative to the ball screw, and this translation may in turn generate a braking force.

SUMMARY

In various embodiments, an EMA is disclosed. In various embodiments, the EMA may comprise a ball screw having at least one tab extending from an inner surface thereof and/or an actuator drive unit ("ADU") housing that interfaces with the at least one tab. The ball screw may include three tabs extending from the inner surface thereof. An outer surface of the ball screw may be threaded to mate with a threaded portion of an inner surface of the ADU housing (e.g., the outer portion of the surface of the ball screw may include bearing tracks to mate with hearing tracks situated on an inner surface of the ADU housing), and/or the ADU housing may interface with the at least one tab, and the ball screw may be rotated to translate a ball nut situated concentrically (i.e., coaxially or substantially coaxially) over the ball screw. The ADU housing may contain or include a gear train assembly having a carrier plate, wherein the carrier plate includes at least one receptacle or ball screw tab. In various embodiments, at least one receptacle may be configured to receive one or more ball bearings. The ball bearings may be received by the at least one receptacle through a slot formed in the ball screw. The ball bearings may be received by the at least one receptacle through a slot formed in the ADU housing. The ADU housing may include a gear train assembly having a carrier plate, wherein the carrier plate includes three receptacles.

In various embodiments, a ball screw is disclosed. The ball screw may comprise a cylinder defined by an inner surface and an outer surface and/or at least one tab extending from the inner surface. Further, the ball screw may include three tabs extending from an inner surface thereof, and/or at least one tab may receive an edge of actuator drive unit ("ADU") housing to retain the ADU housing within the ball screw, An outer surface of the ball screw may be threaded (e.g., the outer surface of the ball screw may contain tracks) to interface with a threaded portion (e.g., a raceway) of an inner surface of ball nut. An actuator drive unit ("ADU") housing may interface with the at least one tab. A slot formed in the ball screw and/or the ball nut may be configured to receive a ball bearing, A carrier plate for an EMA gear train is disclosed. The carrier plate may comprise a tab or receptacle that receives an ADU housing and/or one or more ball screw tabs, In various embodiments, a plurality of tabs (e.g., three) tabs may receive the ADU housing and/or one or more tabs or receptacles on the ball screw. In various embodiments, a snap ring is not needed to maintain the gear train within the ADU housing while driving the ball screw.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
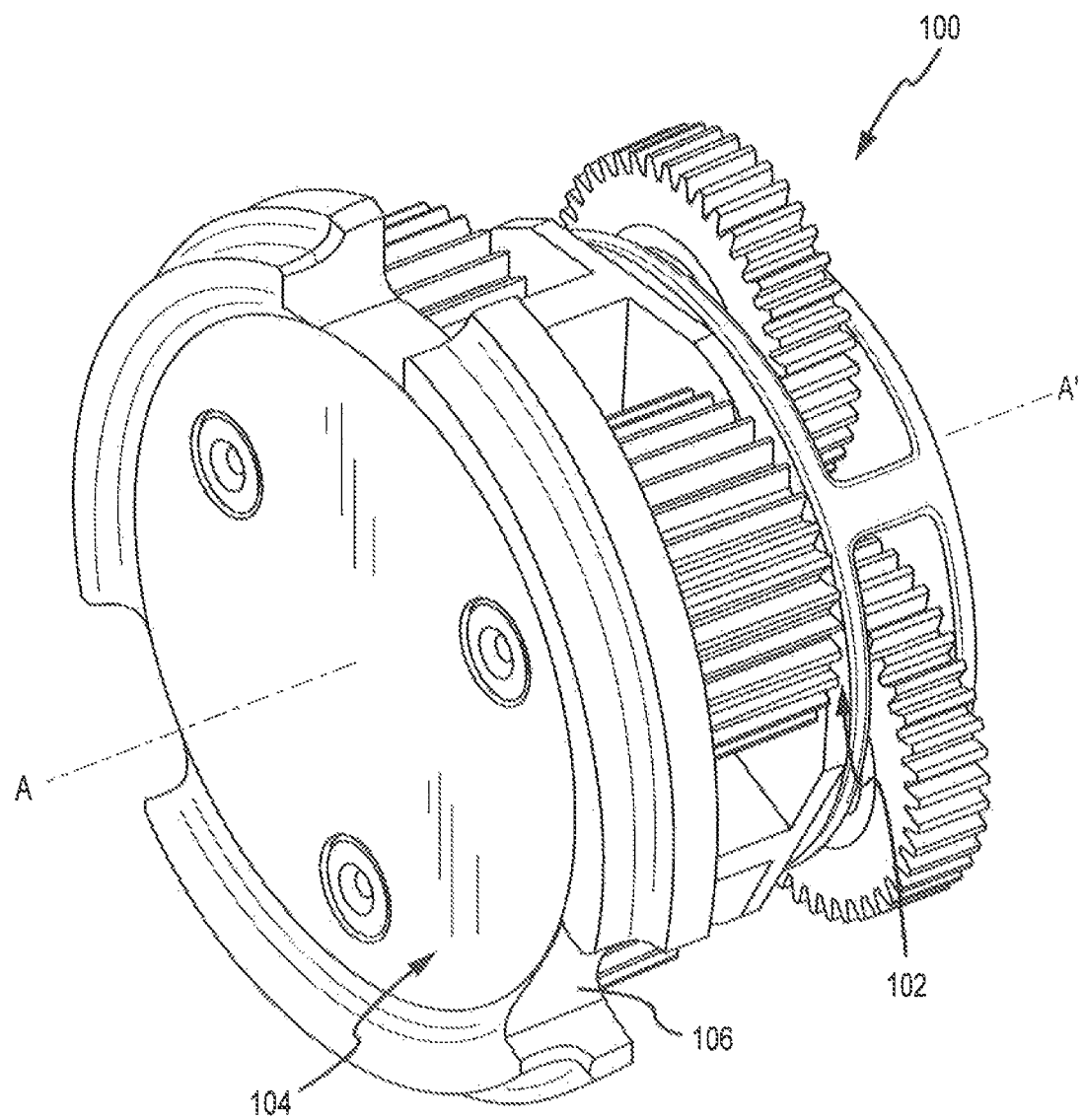
FIG. 1 illustrates, in accordance with various embodiments, a perspective view of a gear train assembly coupled to a carrier plate.

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

An electromechanical actuator ("EMA") having tabs and/or tab receptacles is disclosed. The electromechanical actuator may be capable of braking a vehicle wheel, such as an aircraft wheel.

As used herein, an "inner surface" may comprise any surface that is situated radially inward of any other surface with respect to the axis, as defined herein, labeled A-A'. Thus, an inner surface may be situated radially inward of an "outer surface" with respect to the axis A-A'.

A ball screw, which may be housed within a ball screw housing or "ball nut," is also disclosed. The ball screw may rotate within the ball nut, as described herein, about a central axis. Channels may be formed in a generally axially progressing direction along an inner surface of the ball nut as well as along an outer surface of the ball screw. The intersection of these channels may form a bearing or bearing channel through which one or more balls may travel. As used herein, the term "balls" may refer to a ball bearing, such as a metallic ball bearing. Thus, the ball nut may be translated in an axial direction over the ball screw as the ball screw rotates.

Further, in various embodiments, a gear train assembly and motor may be situated within an interior portion of an actuator drive unit ("ADU") housing, which may be situated within an interior portion of the ball screw. The gear train may be coupled to the motor and may drive the gear train which may in turn drive the ball screw. The gear train may be coupled to a carrier plate, which may comprise a circumference having a plurality of recessed portions or receptacles. A ball screw may correspondingly comprise an inner circumference having a plurality of raised portions or tabs. As the carrier plate is inserted within the ball screw, the tabs in the ball screw may act as a ledge or backstop beyond which the carrier plate may not extend, Thus, the carrier plate and gear train may be retained within the ball screw. Further, the receptacles formed in the carrier plate and/or ADU housing may receive, through slots in the ball screw, a plurality of balls, which may be deposited to circulate during operation between the ball screw and the ADU housing.

With reference to FIG. 1, a gear train assembly 102 coupled to a carrier plate 104 is shown. The gear train assembly 102 and the carrier plate 104 may comprise an assembly 100. The gear train assembly 102 may extend along an axis defined by the line marked A-A'. The portion near A may be referred to as proximal and the portion near A' may be referred to as distal. In that regard, A is proximal to A' and A' is distal to A.

As described above, the carrier plate may comprise a plurality of recessed portions or receptacles 106. With momentary reference to FIG. 2, a receptacle 106 may, through a tab or slot formed in the ball screw 204 and/or ball nut 206, permit the insertion of one or more balls or ball bearings and/or drive torque from the carrier plate 104 to the ball screw 204, Axial retention may be obtained by inserting balls between the ADU housing 202 and the ball screw 204 in a thrust bearing, such as a "multi-row thrust bearing," In various embodiments, balls may be loaded through a ball insertion slot 210 in the ball screw 204. In various embodiments, the ball insertion slot 210 may hold the assembly together. Thus, balls may be inserted in the EMA after its formation.

Figure 2:
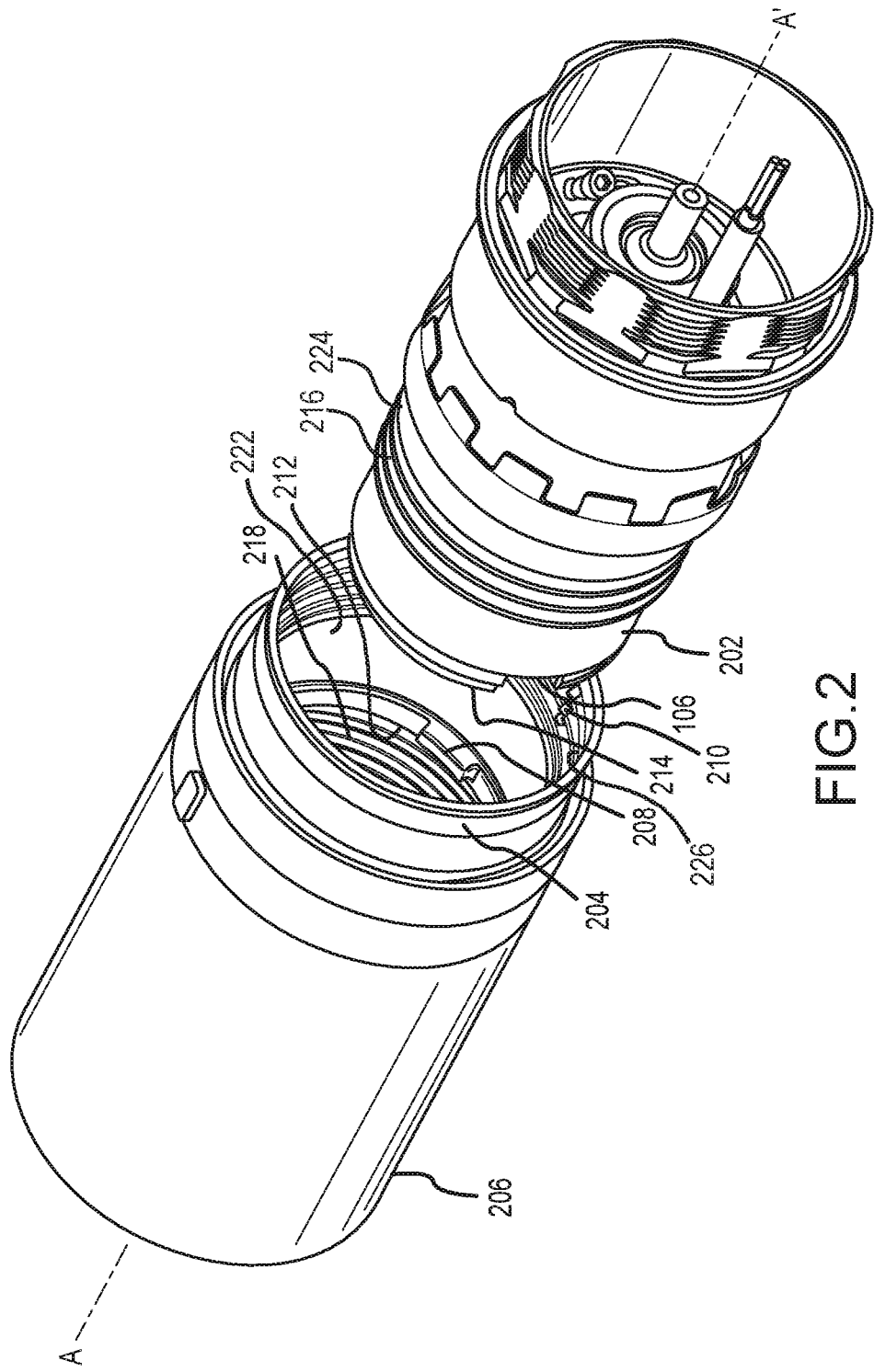
FIG. 2 illustrates, in accordance with various embodiments, an exploded view of a ball nut, ball screw, and actuator drive unit housing.

With respect to FIG. 2, an actuator drive unit ("ADU") housing 202, ball screw 204, and ball nut 206 are shown. FIG. 2 illustrates peripheral edge 212 of ball screw 204. FIG. 2 illustrates bearing tracks 216 disposed on ADU housing 202. FIG. 2 illustrates inner surface 222 of ball screw 204. FIG. 2 illustrates outer surface 224 of ADU housing 202. FIG. 2 illustrates bearing tracks 226 disposed in inner surface 222 of ball screw 204. As shown, the ADU housing 202, ball screw 204, and ball nut 206 may each comprise a cylinder defined by an inner surface and an outer surface. As also shown, and as described herein, the ADU housing 202 may receive and/or house the motor and gear train assembly 102. In addition, the ball screw 204 may receive and/or house the ADU housing 202. Similarly, the ball nut 206 may receive and/or house the ball screw 204. The ADU housing 202, ball screw 204, and ball nut 206 may extend along the axis defined by the line marked A-A'.

The ADU housing 202 may be inserted within the ball screw 204 until slot 106 interfaces with tab 208 and/or until an edge 214 of the ABU housing 202 meets a tab 208 extending from an inner surface of the ball screw 204. Thus, the ADU housing 202 may extend within the ball screw 204 to a position substantially flush with the tab 208, whereupon the tab 208 may act as a backstop, preventing the ADU housing 202 from further progress through the interior of the ball screw 204. Further, although only a single tab 208 is visible in FIG. 2, a plurality of tabs may be situated around the circumference of the ball screw 204 (see, e.g., FIG. 3).

In various embodiments, as described herein, a channel may be formed in an outer surface of the ball screw 204 and a channel 218 may be formed in the ball nut 206 to form, once the ball screw 204 is inserted in the ball nut 206, a bearing or bearing channel.

In operation, the motor may, through the gear train 102 housed within the ADU housing 202, drive the ball screw 204. The ball screw 204 may, in turn, rotate within the ball nut 206A. As the ball screw 204 rotates, the ball nut 206 may translate on the bearing channel formed between the ball screw 204 and the ball nut 206, axially along the axis A-A' over the outer surface of the ball screw 204, Thus, in other words, the ball nut 206 may be "screwed over" the ball screw 204.

Figure 3:
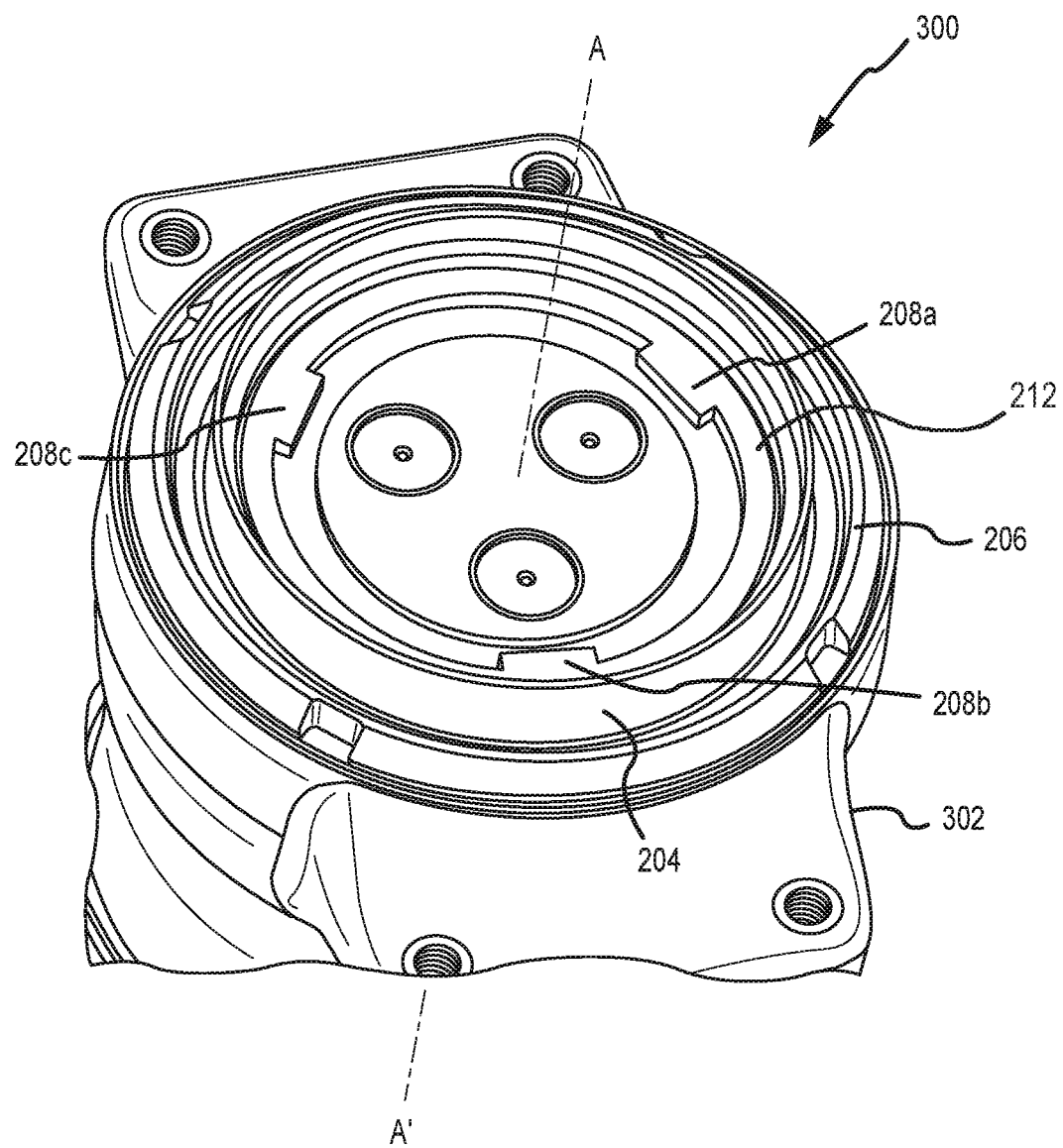
FIG. 3 illustrates, in accordance with various embodiments, a perspective view of an assembled electromechanical actuator.

With reference now to FIG. 3, a top view of a completely assembled EMA 300 is shown. FIG. 3 illustrates peripheral edge 212 of ball screw 204. As shown, the ball nut 206 has been translated axially along the axis A-A' such that the ball screw 204 is substantially entirely housed within the ball nut 206. In addition, three tabs 208a-208c are depicted. In various embodiments, an EMA housing 302 may receive and/or house the ball nut 206.

Among other benefits, various embodiments of the present disclosure, may reduce and/or eliminate the need for a separate retaining structure to retain the ADU housing within or partially within the balls screw. Conventionally, retaining structures such as a "snap ring" which may typically be made of a metal such as spring steel, were used to retain an ADU housing within a ball screw. Retaining structures add weight, which is not desirable, and become a potential point of failure and/or wear. In various embodiments, the elimination of a retaining structure allows fur a less expensive, lighter, more easily assembled, and more durable EMA.

Figure 4:
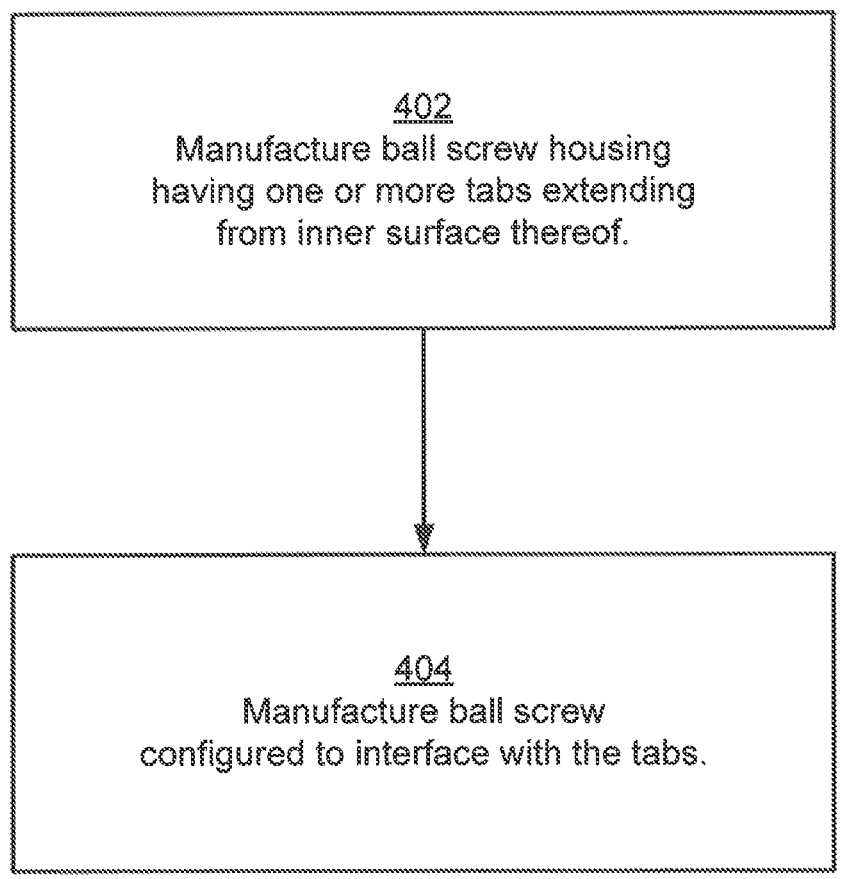
FIG. 4 illustrates, in accordance with various embodiments, a process for assembling an electromechanical actuator having a tabbed ball screw housing.

With reference to FIG. 4, a process for manufacturing an EMA having a tabbed ball screw 204 is described, In various embodiments, a ball screw 204 may be machined or manufactured, wherein the ball screw 204 includes one or more tabs 208a-208c that project or extend from an inner surface or circumference of the ball screw 204 (step 402). Further, in various embodiments, an ADU housing 202 may be manufactured, wherein the ADU housing 202 is configured to interface with (e.g., rest on and/or otherwise couple to) the one or more tabs 208a-208c.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electromechanical actuator comprising:
    a ball screw comprising a cylinder defined by an inner surface, an outer surface, and a peripheral edge, the ball screw having at least one tab extending radially inward from the inner surface proximate the peripheral edge; and
    an actuator drive unit housing that interfaces with the at least one tab
    wherein the inner surface of the ball screw includes bearing tracks to mate with bearing tracks on an outer surface of the actuator drive unit housing, and
    wherein the ball screw is rotated to axially translate a ball nut situated concentrically over the ball screw.

2. The electromechanical actuator of claim 1, wherein the ball screw includes three tabs extending from the inner surface thereof.

3. The electromechanical actuator of claim 1, wherein the actuator drive unit housing includes a gear train assembly having a carrier plate, wherein the carrier plate includes at least one receptacle.

4. The electromechanical actuator of claim 1, wherein the actuator drive unit housing includes a gear train assembly having a carrier plate, wherein the carrier plate includes three receptacles.

5. A ball screw comprising:
    a cylinder defined by an inner surface, an outer surface, and a peripheral edge, the ball screw having at least one tab extending radially inward from the inner surface proximate the peripheral edge,
    wherein the ball screw is configured to interface with an actuator drive unit housing via the at least one tab,
    wherein the inner surface of the ball screw includes bearing tracks to mate with bearing tracks on an outer surface of the actuator drive unit housing, and
    wherein the ball screw is rotated to axially translate a ball nut situated concentrically over the ball screw.

6. The ball screw of claim 5, wherein the ball screw includes three tabs extending radially inward from the inner surface.

7. The ball screw of claim 5, wherein the at least one tab receives an edge of the actuator drive unit housing to retain the actuator drive unit housing within the ball screw.

8. The electromechanical actuator of claim 3, wherein the interfacing is performed via the at least one receptacle of the carrier plate contacting the at least one tab of the ball screw.

* * * * *